Patented June 6, 1939

2,160,949

UNITED STATES PATENT OFFICE 2,160,949

USE OF ALKALI VANADATES IN REDUCING VISCOSITY AND GELATION OF DRILLING MUDS

Milton Williams, Houston, Tex., assignor to Standard Oil Development Company, a corporation of Delaware No Drawing. Application October 16, 1937, Serial No. 169,460

12 Claims. (Cl. 255—1)

This invention is directed to a drilling fluid and a method for controlling the viscosity thereof.

A drilling fluid is a system usually comprising water, colloidal material, including both gel forming and non-gel forming types, and large particles suspended in the water. Ordinarily the fluid is a slurry of clay in water and may or may not contain weighting material, which is generally a heavy inorganic compound such as any one of various heavy metal oxides or sulfates, and is conventionally referred to as a drilling mud. A typical mud may weigh from 9–18# per gallon.

Of the two types of colloids present the gel forming type is the more important for this type imparts the necessary properties to the drilling mud, namely, stability of suspension, thixotropy, viscosity, pure sealing and gel characteristics in general. Colloids of the nongelling type, together with the larger particles, contribute somewhat to viscosity but more particularly to the density of the mud.

It is generally desirable in drilling practice to maintain the viscosity of the mud below about 20 centipoises as measured by the Stormer viscosimeter at 10 revolutions per second. Various factors tend to increase the viscosity of the mud. Among these are the infusion into the mud from the substrata of inorganic materials of a gel forming nature and the high temperatures to which the mud is subjected as the depth of the hole increases. It is, therefore, the practice to add to the drilling mud agents which tend to reduce or limit the increase in the viscosity of the mud.

It is not sufficient that a particular agent is capable of reducing the viscosity of a drilling mud at ordinary temperature. It is necessary that the agent retain its viscosity reducing property after being subjected to the elevated temperatures encountered in boreholes. For this reason a reagent which will not effect as great a reduction at normal temperature as another reagent may, nevertheless, be the more desirable of the two if it possesses to a greater degree the property of retaining its viscosity reducing power after being subjected to elevated temperatures.

According to the present invention the viscosity and gelling characteristics of a drilling mud are controlled by adding to the drilling mud a compound of vanadium in which the vanadium is present in the anion. Typical compounds of this nature are the alkali vanadates, including sodium orthovanadate, sodium pyrovanadate, sodium metavanadate and the pyrogenetic derivatives thereof, particularly those which are obtained by fusing sodium metavanadate and quickly chilling the melt. Other vanadium compounds of this type are the complex compounds in which vanadium oxide is combined with an oxide of another element in the anion, for example, sodium vanadato molybdate, sodium vanadato tungstate, etc. Likewise, various combinations of vanadium pentoxide and caustic soda, in which the ratio of sodium to vanadium may be varied over wide limits, may be employed.

Ordinarily the treating agent in aqueous solution is added to the mud as the latter is circulated from the storage pit to the borehole. The treating agent can, however, be added in solid form or it may be mixed with clays or weighting material prior to the addition of either of these to the mud. Only small amounts of the treating agent need be employed in order to effect the desired decrease in viscosity. The use of amounts varying from traces up to about 5%, by weight, of the mud is contemplated. It is to be understood that an excess over the designated upper limit has no harmful effect.

In the following specific examples, which are included merely to illustrate the invention and not to define the limits thereof, drilling mud viscosities are given as the number of grams required to drive a Stormer viscosimeter containing the drilling mud at certain specified rates. In each case the treating agent was used as a 5% water solution.

Example I

A 200 cc. sample of a drilling mud having a viscosity of 130 grams driving force at 600 R. P. M. was treated with sodium vanadate with the following results:

| Amount added | Driving force at 600 R. P. M. |
|---|---|
| | Grams |
| 0.5 cc | 85 |
| 1.0 cc | 70 |
| 1.5 cc | 70 |
| 2.0 cc | 70 |

Example II 50 grams of $Na_2CO_3$ were dissolved in 600 cc. of $H_2O$. Commercial vanadium pentoxide was dissolved in this solution at 80° C. until the saturation point was reached (80 g. added).

The turbid solution was filtered and glacial acetic acid was added at 80° C. until a faint precipitate of vanadium pentoxide appeared. The mixture was then filtered and sodium deuterovanadate was recovered from the filtrate by crystallization.

200 cc. of a mud having an original viscosity of 145 grams at 600 R. P. M. was treated with 1 cc. of sodium deuterovanadate with the following results:

| Stormer R. P. M. | Grams driving mass |
|---|---|
| 600 | 110 |
| 400 | 81 |
| 300 | 72 |
| 200 | 61 |
| 100 | |

After standing for several hours the treated mud had the following viscosities:

| Stormer R. P. M. | Grams driving mass |
|---|---|
| 600 | 90 |
| 400 | 59 |
| 300 | 45 |
| 200 | 35 |
| 100 | 24 |

After being heated on a steam bath for 72 hours the treated mud had the following viscosities:

| Stormer R. P. M. | Grams driving mass |
|---|---|
| 600 | 96 |
| 400 | 63 |
| 300 | 49 |
| 200 | 39 |
| 100 | 30 |

EXAMPLE III

Several 200 cc. samples of mud were treated with 1.0 cc. of 5% solutions of (a) sodium orthovanadate, (b) sodium metavanadate, (c) a solution of $V_2O_5$ in NaOH to make $Na_3VO_4$, and (d) sodium hexametaphosphate, respectively. The following were the initial effects on the viscosities of the mud:

*Untreated mud*

| Stormer R. P. M. | Grams weight |
|---|---|
| 600 | 135 |
| 400 | 121 |
| 300 | 115 |
| 200 | 106 |
| 100 | 99 |

(a)

| | |
|---|---|
| 600 | 91 |
| 400 | 60 |
| 300 | 56 |
| 200 | 50 |
| 100 | 45 |

(b)

| | |
|---|---|
| 600 | 72 |
| 400 | 41 |
| 300 | 31 |
| 200 | 20 |
| 100 | 13 |

(c)

| | |
|---|---|
| 600 | 81 |
| 400 | 50 |
| 300 | 37 |
| 200 | 25 |
| 100 | 18 |

(d)

| | |
|---|---|
| 600 | 95 |
| 400 | 61 |
| 300 | 50 |
| 200 | 41 |
| 100 | 37 |

These samples were heated on a steam chest at 63° C. for 22 hours. After they became cool the following viscosities were observed:

*Untreated mud*

| Stormer R. P. M. | Grams driving mass |
|---|---|
| 600 | 150 |
| 400 | 131 |
| 300 | 128 |
| 200 | |
| 100 | |

(a)

| | |
|---|---|
| 600 | 99 |
| 400 | 75 |
| 300 | 68 |
| 200 | 60 |
| 100 | 55 |

(b)

| | |
|---|---|
| 600 | 80 |
| 400 | 49 |
| 300 | 37 |
| 200 | 28 |
| 100 | 20 |

(c)

| | |
|---|---|
| 600 | 81 |
| 400 | 47 |
| 300 | 35 |
| 200 | 25 |
| 100 | 16 |

(d)

| | |
|---|---|
| 600 | 122 |
| 400 | 97 |
| 300 | 91 |
| 200 | 86 |
| 100 | 80 |

After 22 hours more at 63° C. the samples had the following viscosities:

*Untreated mud*

| Stormer R. P. M. | Grams driving mass |
|---|---|
| 600 | 152 |
| 400 | 135 |
| 300 | 130 |
| 200 | |
| 100 | |

(a)

| | |
|---|---|
| 600 | 110 |
| 400 | 83 |
| 300 | 77 |
| 200 | 72 |
| 100 | 65 |

(b)

| | |
|---|---|
| 600 | 81 |
| 400 | 50 |
| 300 | 38 |
| 200 | 30 |
| 100 | 21 |

(c)

| Stormer R.P.M. | Grams driving mass |
|---|---|
| 600 | 75 |
| 400 | 45 |
| 300 | 32 |
| 200 | 24 |
| 100 | 16 |

(d)

| Stormer R.P.M. | Grams driving mass |
|---|---|
| 600 | 140 |
| 400 | 112 |
| 300 | 103 |
| 200 | 97 |
| 100 | 91 |

After a further 98 hours heating at 63° C. the following final viscosities were measured:

*Untreated mud*

| Stormer R. P. M. | Grams driving mass |
|---|---|
| 600 | 167 |
| 400 | 155 |
| 300 |  |
| 200 |  |
| 100 |  |

(a)

| Stormer R.P.M. | Grams driving mass |
|---|---|
| 600 | 135 |
| 400 | 126 |
| 300 |  |
| 200 |  |
| 100 |  |

(b)

| Stormer R.P.M. | Grams driving mass |
|---|---|
| 600 | 92 |
| 400 | 63 |
| 300 | 50 |
| 200 | 42 |
| 100 | 37 |

(c)

| Stormer R.P.M. | Grams driving mass |
|---|---|
| 600 | 82 |
| 400 | 56 |
| 300 | 44 |
| 200 | 35 |
| 100 | 26 |

(d)

| Stormer R.P.M. | Grams driving mass |
|---|---|
| 600 | 160 |
| 400 | 145 |
| 300 |  |
| 200 |  |
| 100 |  |

EXAMPLE IV 10 grams of vanadium pentoxide and 10 grams of 85% $MoO_3$ were dissolved with heating in just sufficient caustic soda to effect solution. The slightly turbid liquid was filtered and the filtrate was neutralized with dilute acetic acid and evaporated to dryness. The product was sodium hexavanadatohexamolybdate.

1 cc. of a 5% solution of this compound was added to 200 cc. of a drilling mud having an original viscosity of 145 grams at 600 R. P. M. The viscosity of the sample dropped to 129 grams at 600 R. P. M. After being heated for 72 hours in a steam chest at 63° C. the viscosity of the treated mud was 128 grams at 600 R. P. M.

EXAMPLE V $WO_3H_2O$ was added to a hot solution of NaOH until a neutral reaction was obtained. The solution was filtered, heated to boiling and $V_2O_5XH_2O$ added.

The mixture was boiled 4 hours, filtered, heated to boiling, and a fresh portion of $V_2O_5$ added. When the solution was apparently saturated with the oxide it was filtered. The deep orange colored filtrate was evaporated down to a small volume at 60° C., then was placed in a desiccator over concentrated $H_2SO_4$ to crystallize, yielding sodium divanadat tetratungstate.

200 cc. of a drilling mud having an original viscosity of 145 grams at 600 R. P. M. were treated with 1 cc. of a 5% solution of this product. The viscosity of the mud was reduced to 122 grams. After being heated for 72 hours at 63° C. the treated mud had a viscosity of 125 grams.

EXAMPLE VI

Sodium pyrovanadate was prepared by fusing a mixture of 7.5 grams of anhydrous $V_2O_5$ and 9 grams of anhydrous $Na_2CO_3$, holding the melt at red heat for 2 hours, dissolving the melt, after cooling, in water and precipitating the pyrovanadate, as a liquid, by adding methyl alcohol. 200 cc. of a mud having an initial viscosity of 145 grams at 600 R. P. M. and 122 grams at 400 R. P. M. was treated with 1 cc. of a 5% aqueous solution of the pyrovanadate with a resulting decrease in viscosity to 92 grams at 600 R. P. M. and 68 grams at 400 R. P. M. The treated sample, after being held at 63° C. for 72 hours had a viscosity of 98 grams at 600 R. P. M. and 73 grams at 400 R. P. M.

EXAMPLE VII

In order to determine the effectiveness of the above enumerated vanadium compounds in causing the settling of sand from mud the following experiment was carried out.

A drilling mud was mixed with 80–100 mesh sand in the proportion of two parts by volume of mud to 1 part by volume of sand to form a stable mixture from which sand would not settle out. A 100 cc. sample of this mixture was agitated vigorously and poured into a graduate in which it was allowed to stand for five minutes. The top 10 cc. were then poured off into a 15 cc. centrifuge tube and the sand content was determined by elutriation. The sample showed a sand content of 35.5% by volume.

This experiment was repeated with the addition of 1 cc. of a 5% solution of sodium hexametaphosphate to the sample. This resulted in a reduction of the sand content in the decanted portion of the sample to 6% by volume.

The experiment was again repeated with the addition of 1 cc. of a 5% solution of sodium metavanadate to the sample. This resulted in a decrease in the sand content of the decanted portion of the sample to 1% by volume.

The nature and objects of the present invention having been thus described and illustrated what is claimed as new and useful and is desired to be secured by Letters Patent is:

1. An aqueous slurry of solid mineral matter containing in solution an inorganic compound of vanadium in which the vanadium is present in the anion.

2. A drilling fluid comprising an aqueous slurry of clay containing in solution an inorganic compound of vanadium in which the vanadium is present in the anion.

3. A drilling fluid comprising an aqueous slurry of clay containing in solution an alkali metal vanadate.

4. A drilling fluid comprising an aqueous slurry of clay containing in solution a small amount of an alkali metal metavanadate.

5. A drilling mud comprising an aqueous slurry of clay to which has been added a small amount of a solution of vanadium pentoxide in caustic alkali.

6. A drilling mud comprising an aqueous dispersion of clay containing in solution an alkali metal vanadate metallate.

7. A method for improving the viscosity characteristics of a drilling mud which comprises adding thereto an inorganic compound of vanadium in which the vanadium is present in the anion.

8. A method for improving the viscosity characteristics of a drilling mud which comprises adding thereto an alkali metal vanadate.

9. A method for improving the viscosity characteristics of a drilling mud essentially composed of an aqueous slurry of clay comprising adding thereto an inorganic compound of vanadium in which the vanadium is present in the anion.

10. A method for improving the viscosity characteristics of an aqueous slurry of clay which comprises adding thereto a small amount of an alkali metal vanadate.

11. A method for improving the viscosity characteristics of an aqueous slurry of clay comprising adding thereto a small amount of an alkali metal metavanadate.

12. A method for improving the viscosity characteristics of an aqueous slurry of clay which comprises adding thereto a small amount of an alkali metal vanadate metallate.

MILTON WILLIAMS.